United States Patent
Narasimhan et al.

(10) Patent No.: US 11,748,868 B2
(45) Date of Patent: Sep. 5, 2023

(54) UNSUPERVISED PATTERN SYNONYM DETECTION USING IMAGE HASHING

(71) Applicant: KLA CORPORATION, Milpitas, CA (US)

(72) Inventors: Narayani Narasimhan, New Delhi (IN); Ganesh Meenakshisundaram, Austin, TX (US)

(73) Assignee: KLA CORPORATION, Milpitas, CA (US)

( * ) Notice: Subject to any disclaimer, the term of this patent is extended or adjusted under 35 U.S.C. 154(b) by 177 days.

(21) Appl. No.: 17/464,638

(22) Filed: Sep. 1, 2021

(65) Prior Publication Data

US 2022/0076406 A1 Mar. 10, 2022

Related U.S. Application Data

(60) Provisional application No. 63/105,916, filed on Oct. 27, 2020.

(30) Foreign Application Priority Data

Sep. 8, 2020 (IN) .............................. 202041038794

(51) Int. Cl.
*G06T 7/00* (2017.01)
*G01N 21/88* (2006.01)
*G01N 21/95* (2006.01)
*G06F 18/22* (2023.01)

(52) U.S. Cl.
CPC ....... *G06T 7/0006* (2013.01); *G01N 21/8851* (2013.01); *G01N 21/9501* (2013.01); *G06F 18/22* (2023.01); *G01N 2021/8887* (2013.01); *G06T 2207/30148* (2013.01)

(58) Field of Classification Search
CPC ......... G06T 7/0006; G06T 2207/30148; G06T 7/0004; G01N 21/8851; G01N 21/9501; G01N 2021/8887; G01N 21/95607; G06F 18/22
See application file for complete search history.

(56) References Cited

U.S. PATENT DOCUMENTS

| | | | |
|---|---|---|---|
| 7,421,128 B2 | 9/2008 | Venkatesan et al. | |
| 8,139,843 B2 | 3/2012 | Kulkarni et al. | |
| 10,890,540 B2 * | 1/2021 | Koopman | ........ G01N 21/95607 |

(Continued)

FOREIGN PATENT DOCUMENTS

| | | | | |
|---|---|---|---|---|
| CN | 1841388 B | * | 8/2010 | ............. G03F 1/144 |
| CN | 110457503 A | | 11/2019 | |
| WO | 2020064542 A1 | | 4/2020 | |

OTHER PUBLICATIONS

Hadmi et al., "Perceptual Image Hashing," Watermarking, 2012, pp. 17-42, vol. 2.

(Continued)

*Primary Examiner* — Roy M Punnoose
(74) *Attorney, Agent, or Firm* — HODGSON RUSS LLP (57) ABSTRACT

Images of semiconductor wafers can be hashed to determine a fixed length hash string for each of the images. Pattern synonyms can be determined from the hash strings. The pattern synonyms can be grouped. A degree of similarity between images in the groups is adjustable via a hamming distance. This can be used for various applications, including determination of latent defects.

20 Claims, 6 Drawing Sheets

(56) References Cited

U.S. PATENT DOCUMENTS

| 11,042,776 | B1* | 6/2021 | Buhler | H04N 1/00018 |
| 2009/0080759 | A1 | 3/2009 | Bhaskar et al. | |
| 2013/0173647 | A1* | 7/2013 | Ro | G06F 7/02 |
| | | | | 707/758 |
| 2015/0154746 | A1 | 6/2015 | Zafar et al. | |
| 2016/0110858 | A1* | 4/2016 | Liu | G06T 7/41 |
| | | | | 382/149 |
| 2018/0323966 | A1 | 11/2018 | Kanagaraj | |
| 2020/0072761 | A1* | 3/2020 | Koopman | G03F 7/70625 |
| 2022/0012400 | A1* | 1/2022 | Liu | G05B 19/41875 |

OTHER PUBLICATIONS

Atwood, "Speed Hashing," Coding Horror, Apr. 6, 2012.
WIPO, ISR for International Application No. PCT/US2021/049329, dated Dec. 28, 2021.

* cited by examiner

UNSUPERVISED PATTERN SYNONYM DETECTION USING IMAGE HASHING

CROSS-REFERENCE TO RELATED APPLICATIONS

This application claims priority to Indian patent application 202041038794 filed Sep. 8, 2020 and U.S. App. No. 63/105,916 filed Oct. 27, 2020, the disclosures of which are hereby incorporated by reference.

FIELD OF THE DISCLOSURE

This disclosure relates to defect detection for semiconductor wafers.

BACKGROUND OF THE DISCLOSURE

Evolution of the semiconductor manufacturing industry is placing greater demands on yield management and, in particular, on metrology and inspection systems. Critical dimensions continue to shrink, yet the industry needs to decrease time for achieving high-yield, high-value production. Minimizing the total time from detecting a yield problem to fixing it maximizes the return-on-investment for a semiconductor manufacturer.

Fabricating semiconductor devices, such as logic and memory devices, typically includes processing a semiconductor wafer using a large number of fabrication processes to form various features and multiple levels of the semiconductor devices. For example, lithography is a semiconductor fabrication process that involves transferring a pattern from a reticle to a photoresist arranged on a semiconductor wafer. Additional examples of semiconductor fabrication processes include, but are not limited to, chemical-mechanical polishing (CMP), etching, deposition, and ion implantation. An arrangement of multiple semiconductor devices fabricated on a single semiconductor wafer may be separated into individual semiconductor devices.

Inspection processes are used at various steps during semiconductor manufacturing to detect defects on wafers to promote higher yield in the manufacturing process and, thus, higher profits. Inspection has always been an important part of fabricating semiconductor devices such as integrated circuits (ICs). However, as the dimensions of semiconductor devices decrease, inspection becomes even more important to the successful manufacture of acceptable semiconductor devices because smaller defects can cause the devices to fail. For instance, as the dimensions of semiconductor devices decrease, detection of defects of decreasing size has become necessary because even relatively small defects may cause unwanted aberrations in the semiconductor devices.

Pattern synonyms are a group of inexact design patterns that are similar enough to fail due to similar root causes. Pattern synonyms can be grouped together to detect and control critical patterns such as latent defects and partial failures inline during production. These defects, which affect reliability, are typically statistically insignificant.

Detecting pattern synonyms is a tedious, manual, and time-consuming process. Results can be based on a user's experience. An optical proximity correction (OPC) rule-based search is another method for detecting pattern synonyms. Given one pattern, an inexact search can be performed to detect other similar patterns. Unfortunately, this OPC rule-based process is slow, supervised, and cannot be practically implemented for all patterns. The design-based grouping (DBG) algorithm is faster and unsupervised, but is an exact search algorithm and does not always serve this purpose. Aspects of DBG are disclosed in U.S. Pat. No. 8,139,843, which is incorporated herein by reference. Furthermore, DBG may function on a wafer level, so trends across wafers cannot be easily analyzed.

With these previous techniques, inexact search algorithms have a slow turnaround time that impacts production schedules. Exact search solutions are faster, but divide the dataset in an unmanageable number of groups that usually cannot be practically monitored in production. Exact search solutions also split designs that have a similar root cause into multiple groups, which hinders root cause analysis.

Therefore, new systems and techniques are needed.

BRIEF SUMMARY OF THE DISCLOSURE

A system is provided in a first embodiment. The system includes a semiconductor wafer inspection system and a processor in electronic communication with the semiconductor wafer inspection system. The semiconductor wafer inspection system can include a light source or an electron beam source. The processor is configured to receive a plurality of images from the semiconductor wafer inspection system, hash the images thereby determining a fixed length hash string for each of the images whereby a plurality of the hash strings are determined, and determine pattern synonyms from the hash strings. The images are semiconductor inspection images.

The processor can be further configured to group the hash strings with pattern synonyms. The grouping can be based on a degree of similarity. The degree of similarity is adjustable via a hamming distance. In an instance, one of the pattern synonyms is latent defects.

Each of the images can be of an entire surface of a semiconductor wafer, an entire layer of a semiconductor wafer, or a device of a semiconductor wafer.

A method is provided in a second embodiment. The method includes receiving a plurality of images at a processor. The images are semiconductor inspection images. The images are hashed using the processor thereby determining a fixed length hash string for each of the images whereby a plurality of the hash strings are determined. Pattern synonyms are determined from the hash strings using the processor.

The hash strings can be grouped with pattern synonyms using the processor. The grouping can be based on a degree of similarity. The degree of similarity is adjustable via a hamming distance. In an instance, one of the pattern synonyms is latent defects.

Each of the images can be of an entire surface of a semiconductor wafer, an entire layer of a semiconductor wafer, or a device of a semiconductor wafer.

In an instance, at least one of the plurality of images was previously grouped using design-based grouping.

A non-transitory computer-readable storage medium is provided in a third embodiment. The non-transitory computer-readable storage medium includes one or more programs for executing the following steps on one or more computing devices. A plurality of images are hashed thereby determining a fixed length hash string for each of the images whereby a plurality of the hash strings are determined. The images are semiconductor inspection images. Pattern synonyms are determined from the hash strings.

The steps can further include grouping the hash strings with pattern synonyms. The grouping can be based on a degree of similarity. The degree of similarity can be adjusted by changing a hamming distance.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

The embodiments disclosed herein use image hashing-based grouping to perform quick, unsupervised pattern synonym detection. These techniques can be used by semiconductor manufacturers at different steps of the manufacturing process. The embodiments can group multiple patterns together and can work on a minimum common polygon algorithm that excludes several inexact matches.

Systematic defects can cause a larger percentage of yield loss as technology nodes shrink. Root cause analysis of low fail rate (and, therefore, detection rate patterns) can be especially difficult because these are difficult to detect or trend in statistical process control charts. Identifying and grouping pattern synonyms improves the statistical probability of detecting and controlling these defects.

Figure 1:
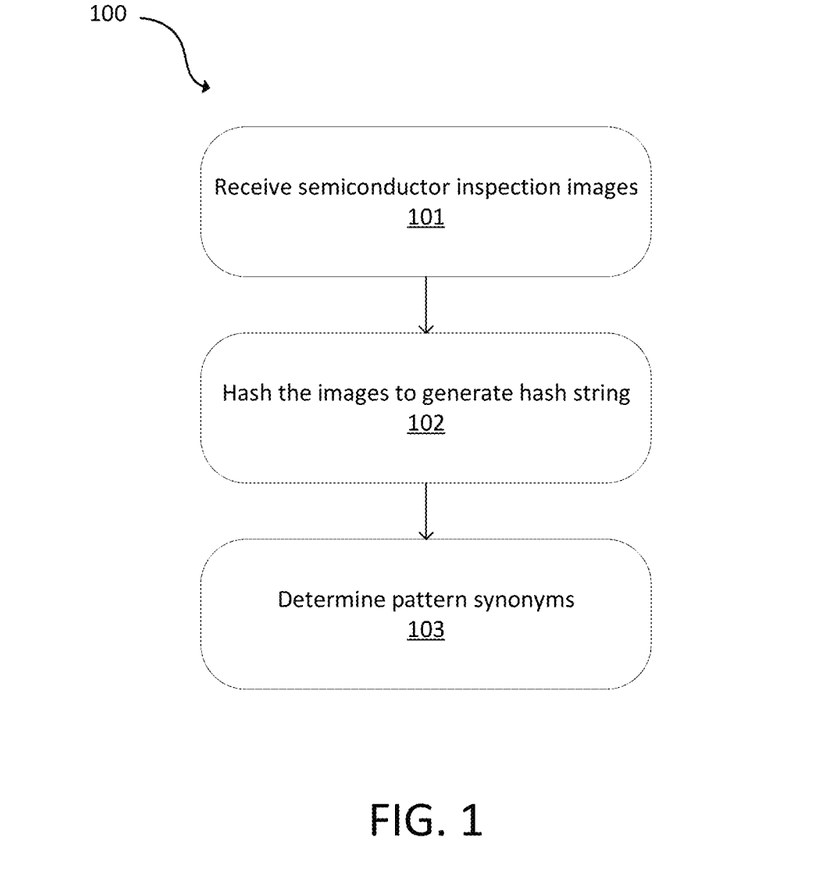
FIG. 1 is an exemplary flowchart of a method in accordance with the present disclosure.

FIG. 1 is an exemplary flowchart of a method 100. Some or all of the steps of the method 100 can use a processor. The method 100 can be used as an improvement to the unsupervised DBG algorithm. The DBG algorithm is an exact search algorithm. This means that even if there were angstrom level differences in the design, the pattern may be split into multiple groups. In a production scenario, this can be cumbersome to handle and it can be impractical to analyze trends over time to determine how critical that pattern group is. Embodiments disclosed herein can be used with DBG. For example, after DBG runs the exact search and groups patterns into one or more groups, one pattern per DBG group is extracted and the hashing method is then used to group "similar but inexact" patterns together. This helps reduce the overall pattern group count in a meaningful way so as to enable analysis in production.

Images are received at 101. The images are semiconductor inspection images. These images can be, for example, an entire surface of a semiconductor wafer, part of a surface of a semiconductor wafer, an entire layer of a semiconductor wafer, part of a layer of a semiconductor wafer, an entire device of a semiconductor wafer, part of a device of a semiconductor wafer, or other inspection images. Each image can be of a different wafer. Each image also can be of different devices or dies on the same or different wafers. Thus, the method 100 can be used in production across wafers, layers, and devices instead of only running on a per wafer level.

In an instance, the images received at 101 were previously grouped using DBG. One pattern or image for the DBG group is selected. The selected pattern or image can be used as the basis to find other pattern synonyms in the DBG group or across multiple DBG groups. This can enable a search for defects otherwise missed or hidden during the DGB grouping.

The images are hashed at 102. The hashing determines a fixed length hash string for each of the images. In an instance, the output of the algorithm is a 64-bit string. The string can be saved for further analysis.

Hashing is a function that can be used to map data of arbitrary size to data of fixed size. A perceptual hash is a type of locality-sensitive hash, which can be analogous if features of the multimedia are similar. Perceptual hashing uses such a function to generate a fixed length hash string for an image. These bit strings are similar for images which are perceptually similar. The hamming distance between two hashes (i.e., the number of bits that differ) indicates how similar two images are.

Figure 2:
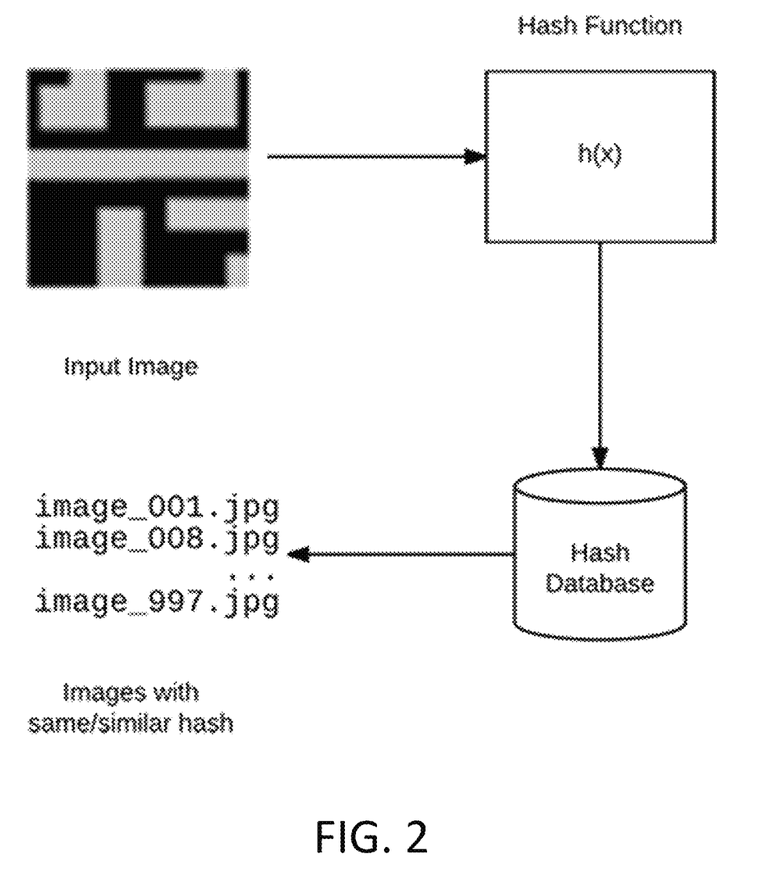
FIG. 2 is an exemplary flowchart of image hashing.

In an example, one exact match design excerpt is selected per DBG group and is sent as the input to the image hashing algorithm. One seed window (i.e., an exact match across all design clips within one DBG group) is selected per DBG group and is sent as the input to the image hashing algorithm. The image hashing flow shown in FIG. 2.

Hashing algorithms such as Averagehash, Differencehash, pHash, or other algorithms can be used. Averagehash was seen to give the best results in terms of grouping purity in an example. Averagehash converts the input image to grayscale and then scales it down. Then the average of all gray values of the image is determined and then the pixels are individually examined from left to right. If the gray value is larger than the average, then a 1 is added to the hash. Otherwise a 0 is added to the hash. Differencehash initially generates a grayscale image from the input image. From each row, the first 8 pixels are examined serially from left to right and compared to their neighbor to the right, which, analogous to Averagehash, results in a hash string. PHash, or perception hash, determines the gray value image and scales it down. A discrete cosine transform is applied to the image, first per row and afterwards per column. The pixels with high frequencies are located in the upper left corner. The median of the gray values in this image are determined and, analogous to Averagehash, results in a hash string.

In an instance, a 64-bit hash length is used. The 64-bit hash length can provide improved performance and accuracy. Other hash lengths are possible. For example, the hash length can be from 64 bits to 256 bits. The hash string length may increase for larger image sizes to preserve their details.

Resolution of the input image can affect the hashing. The pixels of the image affect the hashing, so changes in resolution or size of the image can affect the resulting hash string. In an instance, a best resolution is used for each image. In another instance, the same resolution is used for each image in the method 100.

Turning back to FIG. 1, pattern synonyms are determined from the hash string at 103. After images are hashed, they are grouped to infer pattern synonyms. Various pattern synonyms can be determined, such as latent defects.

The hash strings with pattern synonyms can be grouped. The grouping can be based on a degree of similarity. The degree of similarity can be adjusted by changing a hamming distance. Thus, hamming distance can be used as a tolerance parameter to control the purity of the resulting groups.

Iterative tolerance based grouping can be used in an instance. A UTL_MATCH.EDIT_DISTANCE function can compute hamming distance for running a "looks like" query. This can test measure a similarity between two strings by counting the number of character changes (inserts, updates, deletes) required to transform the first string into the second. The number of changes required is considered as the distance.

Clustering-based grouping is used in another instance. A clustering algorithm like balanced iterative reducing and clustering using hierarchies (BIRCH) can enable grouping of similar patterns. BIRCH is an unsupervised data mining algorithm used to perform hierarchical clustering over datasets. The BIRCH algorithm takes as input a set of N data points, represented as real-valued vectors, and a desired number of clusters K. The hamming distance between hash codes of pattern images is the Euclidean distance used for clustering. This method can avoid crawling problems while maintaining performance.

For example, design clips of patterns can be provided. A semiconductor manufacturer may attempt to print the pattern from the design clip. The method 100 can be used to find patterns that likely will not print properly because the lines are too close together.

In an example, the method 100 allowed an average 42% meaningful reduction in a number of design bins compared to previous methods that generated an exact polygon search. This reduced analysis time for inspection.

Figure 3:
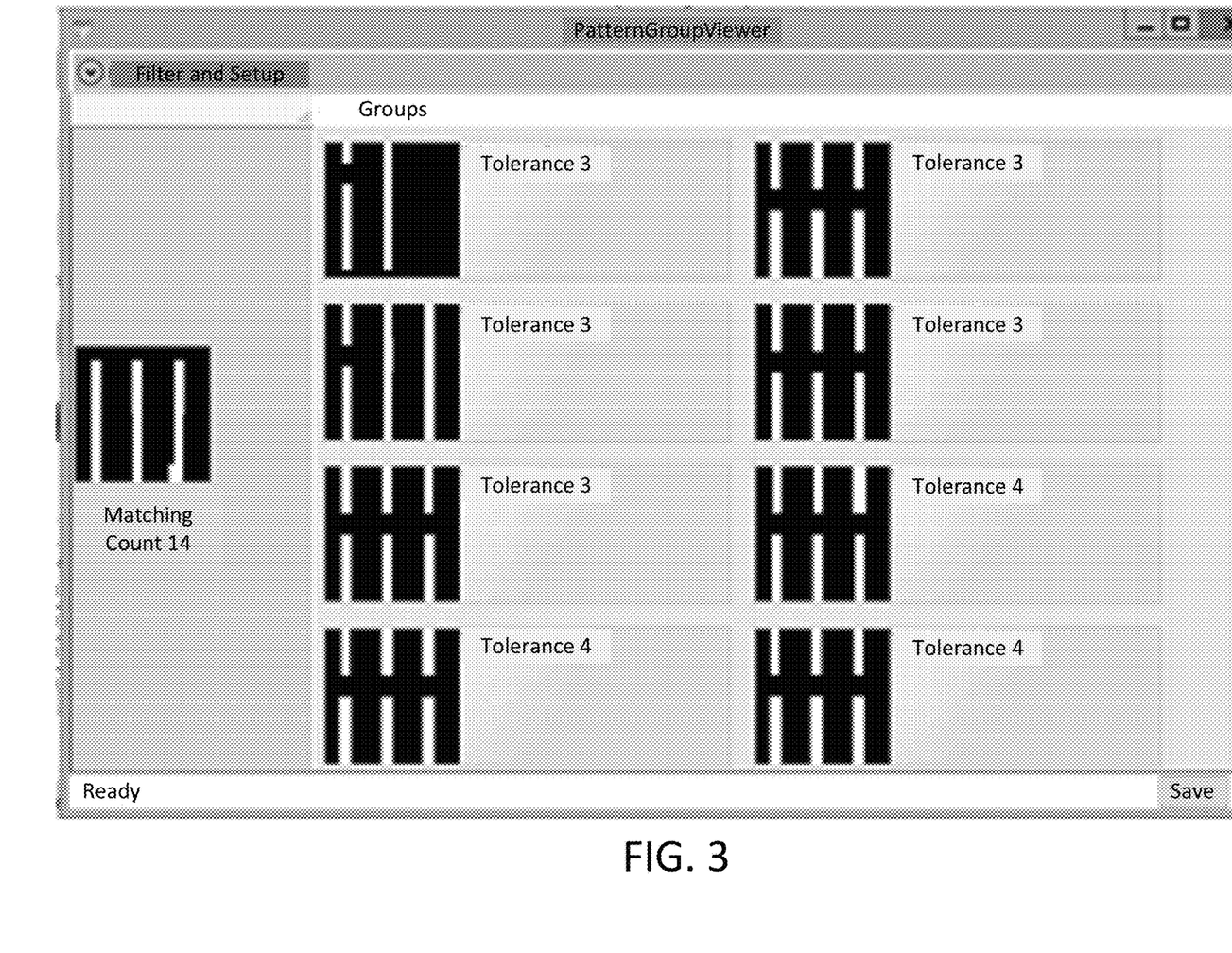
FIG. 3 is an exemplary grouping interface.

The method 100 can be used with a pattern library manager. An option in the pattern library manager can use the method 100. Source and target patterns can be selected manually and, based on a user-defined "tolerance," grouping can be run. This can provide root cause analysis. A grouping interface (e.g., the "PatternGroupViewer" window in FIG. 3) enables a user to analyze and accept the grouping results generated from the method 100.

Embodiments of the method 100 can be used to group pattern synonyms together to detect and control critical patterns, such as latent defects and partial failures inline during production. Latent defects, which affect reliability, are statistically insignificant. Due to the low number of occurrences but high kill rates, latent defects may require grouping to make meaningful inferences. The method 100 can be used to collate design-based data across devices, layers, and wafers and run root cause analysis over a period.

The results of the method 100 can be used as an independent attribute in the database and can be used to study the defect count/pattern group (e.g., with charts and galleries of images). The hash can be persisted in a database and can, therefore, be compared with patterns from future datasets. Unlike a method that changes from run to run, this hash is persistent and will be the same irrespective of run, device, or layer. This enables pattern based yield analysis over a period of time and across devices in a production environment.

In an embodiment, image hash codes generated for pattern images can be persistently saved into database to do fuzzy pattern matching. Fuzzy matching (also called approximate string matching) can identify two elements of the hash string that are approximately similar but are not exactly the same.

Minor artefacts in seed windows can be ignored, which can provide more meaningful grouping for inspection/care area generation and control charts. These minor artefacts do not tend to affect the resulting hash string or only affect the resulting hash string to a minor extent. The hash strings can still be grouped depending on the parameters used.

In terms of dimensions, smaller hotspots can be detected based on larger detected hotspots. It is typically easier for an optical system to detect larger defects (e.g., a large bridge) due to the way in which the defect interact with the light source. After the larger systematic defects are captured, the underlying pattern can be determined using DBG. However, with the method disclosed herein, this analysis can be extended to determine other smaller dimension yet similar looking patterns and create targeted care areas. These targeted care areas can be fed forward into future inspections to run more sensitive inspections at the target care areas and to detect smaller defects (e.g., a smaller bridge).

Groups can be analyzed to feed forward into custom rule based search capabilities. Thus, feed forward process control can be performed by semiconductor manufacturers. If the results of the hash string group identifies a defect, then this defect can be used in other defect review methods.

While disclosed with images of the wafer, the embodiments disclosed herein also can be used with wafer signatures.

The following example is provided for illustrative purposes and are not intended to be limiting.

Figure 4:
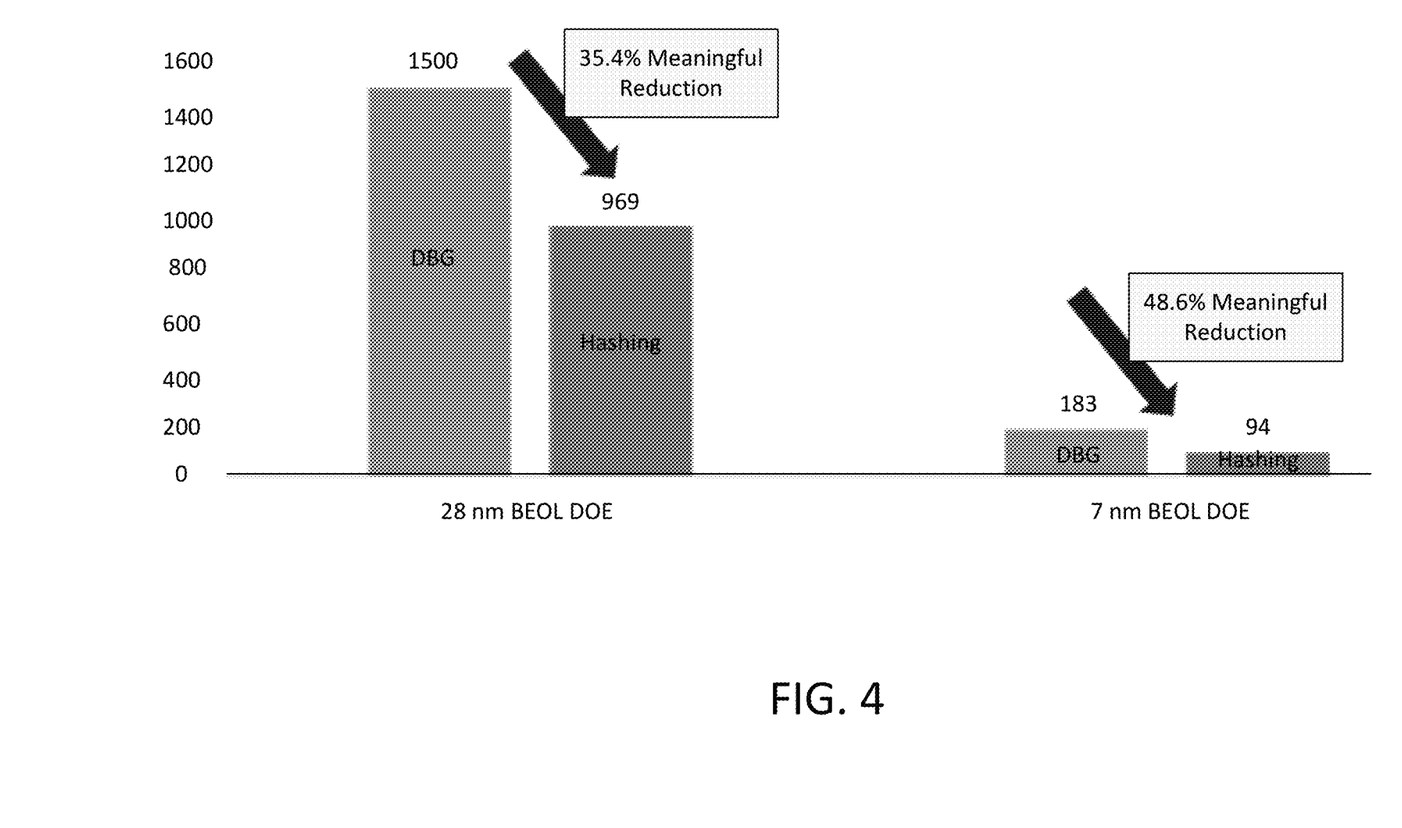
FIG. 4 shows an example that, on average, 42% reduction in bin count is seen comparing image hashing to DBG.

FIG. 4 shows the reduction in bins over two datasets. A 28 nm design dataset and a 7 nm design dataset were used compared to compare DBG against the method described herein. The hamming distance (or tolerance) was found to be a useful parameter to tune the purity of the groups.

Figure 5:
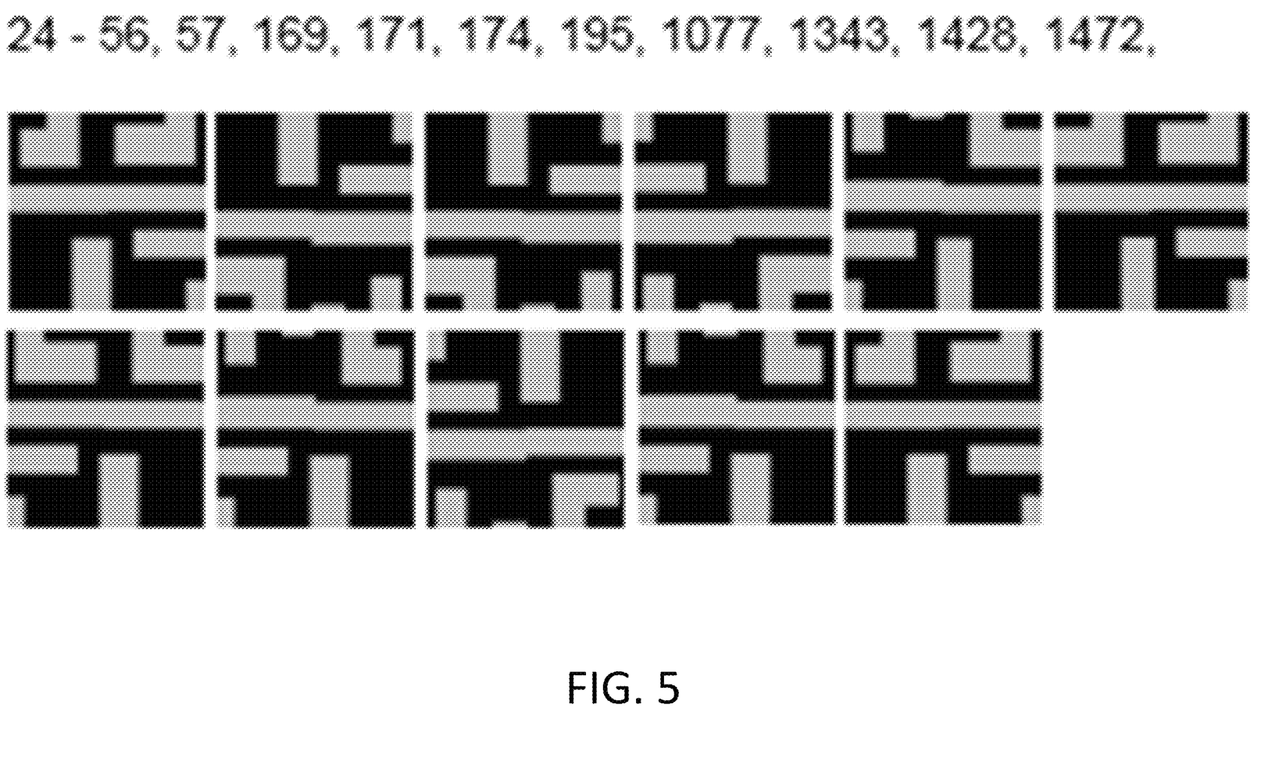
FIG. 5 is an example of 11 DBG groups super-grouped using image hashing, wherein each clip represents a DBG seed window and the corresponding DBG ID is represented in the first line.

FIG. 5 shows an example of the grouping achieved. All the design clips have a common base pattern (horizontal line through the center) along with a vertical line at a right angle. This combination would potentially lead to the same failure mechanism, such as a single line open. Since DBG is an exact search algorithm, the clips are grouped separately due to minor differences in dimensions, additional jogs, and irrelevant structures at the corner of the seed window. This leads to the potentially same hotspot type being separated into different bins. This can make it nearly impossible to sample from all these bins for review or create process control charts across them. Image hashing using the method 100 helps overcome these drawbacks.

A "looks like" query on a 5 million row table takes less than a second. Preliminary performance results are shown in the table below.

| | Performance | |
|---|---|---|
| | 28 nm BEOL (s) | 7 nm BEOL (ms) |
| Generating Hashes (8 per DBG) | 11 | 649 |
| Super Grouping | 2 | 1 |

Thus, image hashing with unsupervised grouping of inexact images can improve results compared to previous techniques.

Figure 6:
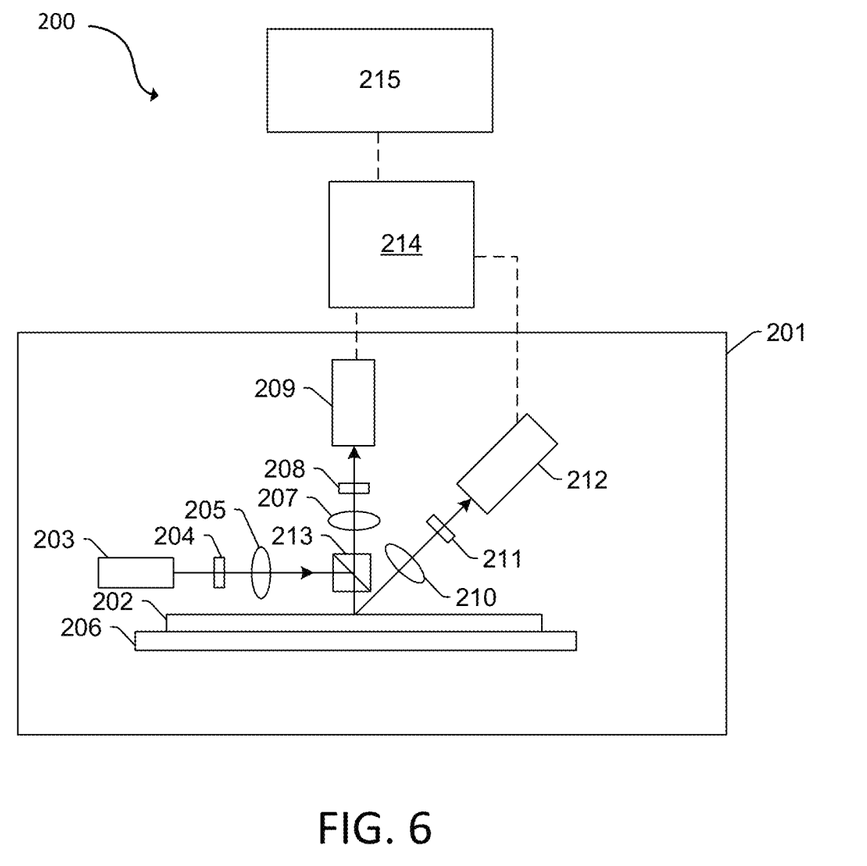
FIG. 6 is a system in accordance with the present disclosure.

One embodiment of a system 200 is shown in FIG. 6. The system 200 includes optical based subsystem 201. In general, the optical based subsystem 201 is configured for generating optical based output for a specimen 202 by directing light to (or scanning light over) and detecting light from the specimen 202. In one embodiment, the specimen 202 includes a wafer. The wafer may include any wafer known in the art. In another embodiment, the specimen 202 includes a reticle. The reticle may include any reticle known in the art.

In the embodiment of the system 200 shown in FIG. 6, optical based subsystem 201 includes an illumination subsystem configured to direct light to specimen 202. The illumination subsystem includes at least one light source. For example, as shown in FIG. 6, the illumination subsystem includes light source 203. In one embodiment, the illumination subsystem is configured to direct the light to the specimen 202 at one or more angles of incidence, which may include one or more oblique angles and/or one or more normal angles. For example, as shown in FIG. 6, light from light source 203 is directed through optical element 204 and then lens 205 to specimen 202 at an oblique angle of incidence. The oblique angle of incidence may include any suitable oblique angle of incidence, which may vary depending on, for instance, characteristics of the specimen 202.

The optical based subsystem 201 may be configured to direct the light to the specimen 202 at different angles of incidence at different times. For example, the optical based subsystem 201 may be configured to alter one or more characteristics of one or more elements of the illumination subsystem such that the light can be directed to the specimen 202 at an angle of incidence that is different than that shown in FIG. 6. In one such example, the optical based subsystem 201 may be configured to move light source 203, optical element 204, and lens 205 such that the light is directed to the specimen 202 at a different oblique angle of incidence or a normal (or near normal) angle of incidence.

In some instances, the optical based subsystem 201 may be configured to direct light to the specimen 202 at more than one angle of incidence at the same time. For example, the illumination subsystem may include more than one illumination channel, one of the illumination channels may include light source 203, optical element 204, and lens 205 as shown in FIG. 6 and another of the illumination channels (not shown) may include similar elements, which may be configured differently or the same, or may include at least a light source and possibly one or more other components such as those described further herein. If such light is directed to the specimen at the same time as the other light, one or more characteristics (e.g., wavelength, polarization, etc.) of the light directed to the specimen 202 at different angles of incidence may be different such that light resulting from illumination of the specimen 202 at the different angles of incidence can be discriminated from each other at the detector(s).

In another instance, the illumination subsystem may include only one light source (e.g., light source 203 shown in FIG. 6) and light from the light source may be separated into different optical paths (e.g., based on wavelength, polarization, etc.) by one or more optical elements (not shown) of the illumination subsystem. Light in each of the different optical paths may then be directed to the specimen 202. Multiple illumination channels may be configured to direct light to the specimen 202 at the same time or at different times (e.g., when different illumination channels are used to sequentially illuminate the specimen). In another instance, the same illumination channel may be configured to direct light to the specimen 202 with different characteristics at different times. For example, in some instances, optical element 204 may be configured as a spectral filter and the properties of the spectral filter can be changed in a variety of different ways (e.g., by swapping out the spectral filter) such that different wavelengths of light can be directed to the specimen 202 at different times. The illumination subsystem may have any other suitable configuration known in the art for directing the light having different or the same characteristics to the specimen 202 at different or the same angles of incidence sequentially or simultaneously.

In one embodiment, light source 203 may include a broadband plasma (BBP) source. In this manner, the light generated by the light source 203 and directed to the specimen 202 may include broadband light. However, the light source may include any other suitable light source such as a laser. The laser may include any suitable laser known in the art and may be configured to generate light at any suitable wavelength or wavelengths known in the art. In addition, the laser may be configured to generate light that is monochromatic or nearly-monochromatic. In this manner, the laser may be a narrowband laser. The light source 203 may also include a polychromatic light source that generates light at multiple discrete wavelengths or wavebands.

Light from optical element 204 may be focused onto specimen 202 by lens 205. Although lens 205 is shown in FIG. 6 as a single refractive optical element, it is to be understood that, in practice, lens 205 may include a number of refractive and/or reflective optical elements that in combination focus the light from the optical element to the specimen. The illumination subsystem shown in FIG. 6 and described herein may include any other suitable optical elements (not shown). Examples of such optical elements include, but are not limited to, polarizing component(s), spectral filter(s), spatial filter(s), reflective optical element(s), apodizer(s), beam splitter(s) (such as beam splitter 213), aperture(s), and the like, which may include any such suitable optical elements known in the art. In addition, the optical based subsystem 201 may be configured to alter one or more of the elements of the illumination subsystem based on the type of illumination to be used for generating the optical based output.

The optical based subsystem 201 may also include a scanning subsystem configured to cause the light to be scanned over the specimen 202. For example, the optical based subsystem 201 may include stage 206 on which specimen 202 is disposed during optical based output generation. The scanning subsystem may include any suitable mechanical and/or robotic assembly (that includes stage 206) that can be configured to move the specimen 202 such that the light can be scanned over the specimen 202. In addition, or alternatively, the optical based subsystem 201 may be configured such that one or more optical elements of the optical based subsystem 201 perform some scanning of the light over the specimen 202. The light may be scanned over the specimen 202 in any suitable fashion such as in a serpentine-like path or in a spiral path.

The optical based subsystem 201 further includes one or more detection channels. At least one of the one or more detection channels includes a detector configured to detect light from the specimen 202 due to illumination of the specimen 202 by the subsystem and to generate output responsive to the detected light. For example, the optical based subsystem 201 shown in FIG. 6 includes two detection channels, one formed by collector 207, element 208, and detector 209 and another formed by collector 210, element 211, and detector 212. As shown in FIG. 6, the two detection channels are configured to collect and detect light at different angles of collection. In some instances, both detection channels are configured to detect scattered light, and the detection channels are configured to detect light that is scattered at different angles from the specimen 202. However, one or more of the detection channels may be configured to detect another type of light from the specimen 202 (e.g., reflected light).

As further shown in FIG. 6, both detection channels are shown positioned in the plane of the paper and the illumination subsystem is also shown positioned in the plane of the paper. Therefore, in this embodiment, both detection channels are positioned in (e.g., centered in) the plane of incidence. However, one or more of the detection channels may be positioned out of the plane of incidence. For example, the detection channel formed by collector 210, element 211, and detector 212 may be configured to collect and detect light that is scattered out of the plane of incidence. Therefore, such a detection channel may be commonly referred to as a "side" channel, and such a side channel may be centered in a plane that is substantially perpendicular to the plane of incidence.

Although FIG. 6 shows an embodiment of the optical based subsystem 201 that includes two detection channels, the optical based subsystem 201 may include a different number of detection channels (e.g., only one detection channel or two or more detection channels). In one such instance, the detection channel formed by collector 210, element 211, and detector 212 may form one side channel as described above, and the optical based subsystem 201 may include an additional detection channel (not shown) formed as another side channel that is positioned on the opposite side of the plane of incidence. Therefore, the optical based subsystem 201 may include the detection channel that includes collector 207, element 208, and detector 209 and that is centered in the plane of incidence and configured to collect and detect light at scattering angle(s) that are at or close to normal to the specimen 202 surface. This detection channel may therefore be commonly referred to as a "top" channel, and the optical based subsystem 201 may also include two or more side channels configured as described above. As such, the optical based subsystem 201 may include at least three channels (i.e., one top channel and two side channels), and each of the at least three channels has its own collector, each of which is configured to collect light at different scattering angles than each of the other collectors.

As described further above, each of the detection channels included in the optical based subsystem 201 may be configured to detect scattered light. Therefore, the optical based subsystem 201 shown in FIG. 6 may be configured for dark field (DF) output generation for specimens 202. However, the optical based subsystem 201 may also or alternatively include detection channel(s) that are configured for bright field (BF) output generation for specimens 202. In other words, the optical based subsystem 201 may include at least one detection channel that is configured to detect light specularly reflected from the specimen 202. Therefore, the optical based subsystems 201 described herein may be configured for only DF, only BF, or both DF and BF imaging. Although each of the collectors are shown in FIG. 6 as single refractive optical elements, it is to be understood that each of the collectors may include one or more refractive optical die(s) and/or one or more reflective optical element(s).

The one or more detection channels may include any suitable detectors known in the art. For example, the detectors may include photo-multiplier tubes (PMTs), charge coupled devices (CCDs), time delay integration (TDI) cameras, and any other suitable detectors known in the art. The detectors may also include non-imaging detectors or imaging detectors. In this manner, if the detectors are non-imaging detectors, each of the detectors may be configured to detect certain characteristics of the scattered light such as intensity but may not be configured to detect such characteristics as a function of position within the imaging plane. As such, the output that is generated by each of the detectors included in each of the detection channels of the optical based subsystem may be signals or data, but not image signals or image data. In such instances, a processor such as processor 214 may be configured to generate images of the specimen 202 from the non-imaging output of the detectors. However, in other instances, the detectors may be configured as imaging detectors that are configured to generate imaging signals or image data. Therefore, the optical based subsystem may be configured to generate optical images or other optical based output described herein in a number of ways.

It is noted that FIG. 6 is provided herein to generally illustrate a configuration of an optical based subsystem 201 that may be included in the system embodiments described herein or that may generate optical based output that is used by the system embodiments described herein. The optical based subsystem 201 configuration described herein may be altered to optimize the performance of the optical based subsystem 201 as is normally performed when designing a commercial output acquisition system. In addition, the systems described herein may be implemented using an existing system (e.g., by adding functionality described herein to an existing system). For some such systems, the methods described herein may be provided as optional functionality of the system (e.g., in addition to other functionality of the system). Alternatively, the system described herein may be designed as a completely new system.

The processor 214 may be coupled to the components of the system 200 in any suitable manner (e.g., via one or more transmission media, which may include wired and/or wireless transmission media) such that the processor 214 can receive output. The processor 214 may be configured to perform a number of functions using the output. The system 200 can receive instructions or other information from the processor 214. The processor 214 and/or the electronic data storage unit 215 optionally may be in electronic communication with a wafer inspection tool, a wafer metrology tool, or a wafer review tool (not illustrated) to receive additional information or send instructions. For example, the processor 214 and/or the electronic data storage unit 215 can be in electronic communication with a scanning electron microscope.

The processor 214, other system(s), or other subsystem(s) described herein may be part of various systems, including a personal computer system, image computer, mainframe computer system, workstation, network appliance, internet appliance, or other device. The subsystem(s) or system(s) may also include any suitable processor known in the art, such as a parallel processor. In addition, the subsystem(s) or system(s) may include a platform with high-speed processing and software, either as a standalone or a networked tool.

The processor 214 and electronic data storage unit 215 may be disposed in or otherwise part of the system 200 or another device. In an example, the processor 214 and electronic data storage unit 215 may be part of a standalone control unit or in a centralized quality control unit. Multiple processors 214 or electronic data storage units 215 may be used.

The processor 214 may be implemented in practice by any combination of hardware, software, and firmware. Also, its functions as described herein may be performed by one unit, or divided up among different components, each of which may be implemented in turn by any combination of hardware, software and firmware. Program code or instructions for the processor 214 to implement various methods and functions may be stored in readable storage media, such as a memory in the electronic data storage unit 215 or other memory.

If the system 200 includes more than one processor 214, then the different subsystems may be coupled to each other such that images, data, information, instructions, etc. can be sent between the subsystems. For example, one subsystem may be coupled to additional subsystem(s) by any suitable transmission media, which may include any suitable wired and/or wireless transmission media known in the art. Two or more of such subsystems may also be effectively coupled by a shared computer-readable storage medium (not shown).

The processor 214 may be configured to perform a number of functions using the output of the system 200 or other output. For instance, the processor 214 may be configured to send the output to an electronic data storage unit 215 or another storage medium. The processor 214 may be configured according to any of the embodiments described herein. The processor 214 also may be configured to perform other functions or additional steps using the output of the system 200 or using images or data from other sources.

Various steps, functions, and/or operations of system 200 and the methods disclosed herein are carried out by one or more of the following: electronic circuits, logic gates, multiplexers, programmable logic devices, ASICs, analog or digital controls/switches, microcontrollers, or computing systems. Program instructions implementing methods such as those described herein may be transmitted over or stored on carrier medium. The carrier medium may include a storage medium such as a read-only memory, a random access memory, a magnetic or optical disk, a non-volatile memory, a solid state memory, a magnetic tape, and the like. A carrier medium may include a transmission medium such as a wire, cable, or wireless transmission link. For instance, the various steps described throughout the present disclosure may be carried out by a single processor 214 or, alternatively, multiple processors 214. Moreover, different subsystems of the system 200 may include one or more computing or logic systems. Therefore, the above description should not be interpreted as a limitation on the present disclosure but merely an illustration.

In an instance, the processor 214 is in communication with the system 200. The processor 214 is configured to perform embodiments of the method 100. The processor 214 can receive a plurality of images (e.g., semiconductor inspection images) from the system 200. The process 214 can hash the images thereby determining a fixed length hash string for each of the images and determine pattern synonyms from the hash strings.

An additional embodiment relates to a non-transitory computer-readable medium storing program instructions executable on a controller for performing a computer-implemented method for classifying a wafer map, as disclosed herein. In particular, as shown in FIG. 6, electronic data storage unit 215 or other storage medium may contain non-transitory computer-readable medium that includes program instructions executable on the processor 214. The computer-implemented method may include any step(s) of any method(s) described herein, including method 100.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes (MFC), Streaming SIMD Extension (SSE), or other technologies or methodologies, as desired.

While the system 200 uses light, the method 100 can be performed using a different semiconductor inspection tool. For example, the method 100 can be performed using results from a system that uses an electron beam, such as a scanning electron microscope, or an ion beam. Thus, the system can have an electron beam source or an ion beam source.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A system comprising:
   a semiconductor wafer inspection system; and
   a processor in electronic communication with the semiconductor wafer inspection system, wherein the processor is configured to:
   receive a plurality of images from the semiconductor wafer inspection system, wherein the images are semiconductor inspection images;
   hash the images thereby determining a fixed length hash string for each of the images, wherein a plurality of the hash strings are determined; and
   determine pattern synonyms from the hash strings.

2. The system of claim 1, wherein the semiconductor wafer inspection system includes a light source or an electron beam source.

3. The system of claim 1, wherein the processor is further configured to group the hash strings with pattern synonyms.

4. The system of claim 3, wherein the grouping is based on a degree of similarity, and wherein the degree of similarity is adjustable via a hamming distance.

5. The system of claim 3, wherein one of the pattern synonyms is latent defects.

6. The system of claim 1, wherein each of the images is of an entire surface of a semiconductor wafer.

7. The system of claim 1, wherein each of the images is of an entire layer of a semiconductor wafer.

8. The system of claim 1, wherein each of the images is of a device of a semiconductor wafer.

9. A method comprising:
   receiving a plurality of images at a processor, wherein the images are semiconductor inspection images;
   hashing the images using the processor thereby determining a fixed length hash string for each of the images, wherein a plurality of the hash strings are determined; and
   determining pattern synonyms from the hash strings using the processor.

10. The method of claim 9, further comprising grouping the hash strings with pattern synonyms using the processor.

11. The method of claim 10, wherein the grouping is based on a degree of similarity.

12. The method of claim 11, further comprising adjusting the degree of similarity by changing a hamming distance.

13. The method of claim 10, wherein one of the pattern synonyms is latent defects.

14. The method of claim 9, wherein each of the images is of an entire surface of a semiconductor wafer.

15. The method of claim 9, wherein each of the images is of an entire layer of a semiconductor wafer.

16. The method of claim 9, wherein each of the images is of a device of a semiconductor wafer.

17. The method of claim 9, wherein at least one of the plurality of images was previously grouped using design-based grouping.

18. A non-transitory computer-readable storage medium, comprising one or more programs for executing the following steps on one or more computing devices:
   hashing a plurality of images thereby determining a fixed length hash string for each of the images, wherein a plurality of the hash strings are determined, and wherein the images are semiconductor inspection images; and
   determining pattern synonyms from the hash strings.

19. The non-transitory computer-readable storage medium of claim 18, wherein the steps further include grouping the hash strings with pattern synonyms, wherein the grouping is based on a degree of similarity.

20. The non-transitory computer-readable storage medium of claim 19, wherein the steps further include adjusting the degree of similarity by changing a hamming distance.

\* \* \* \* \*